(12) United States Patent
Roy Chowdhury

(10) Patent No.: US 11,688,175 B2
(45) Date of Patent: *Jun. 27, 2023

(54) METHODS AND SYSTEMS FOR THE AUTOMATED QUALITY ASSURANCE OF ANNOTATED IMAGES

(71) Applicant: Volvo Car Corporation, Gothenburg (SE)

(72) Inventor: Sohini Roy Chowdhury, Santa Clara, CA (US)

(73) Assignee: Volvo Car Corporation, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,740

(22) Filed: Jul. 19, 2022

(65) Prior Publication Data
US 2022/0351533 A1    Nov. 3, 2022

Related U.S. Application Data

(63) Continuation of application No. 16/867,585, filed on May 6, 2020, now Pat. No. 11,430,240.

(51) Int. Cl.
| G06V 20/56 | (2022.01) |
| G05D 1/02 | (2020.01) |
| G06V 30/413 | (2022.01) |
| G06V 30/19 | (2022.01) |

(52) U.S. Cl.
CPC ........... *G06V 20/56* (2022.01); *G05D 1/0246* (2013.01); *G06V 30/1916* (2022.01); *G06V 30/19147* (2022.01); *G06V 30/413* (2022.01)

(58) Field of Classification Search
CPC ... G06V 30/413; G06V 10/255; G05D 1/0246
See application file for complete search history.

(56) References Cited

U.S. PATENT DOCUMENTS

| 7,890,512 B2 | 2/2011 | Mei et al. |
| 9,158,995 B2 | 10/2015 | Rodriguez-Serrano et al. |
| 11,048,979 B1 | 6/2021 | Zhdanov et al. |
| 11,430,240 B2* | 8/2022 | Roy Chowdhury ........................ G06V 30/1916 |
| 2014/0355879 A1 | 12/2014 | Agosta et al. |
| 2018/0136000 A1 | 5/2018 | Rasmusson, Jr. et al. |
| 2018/0158189 A1* | 6/2018 | Yedla ....................... G06N 3/08 |

(Continued)

FOREIGN PATENT DOCUMENTS

| WO | 2013182298 A1 | 12/2013 |
| WO | 2019110583 A1 | 6/2019 |

*Primary Examiner* — Pinalben Patel
(74) *Attorney, Agent, or Firm* — Clements Bernard Walker; Christopher L. Bernard

(57) ABSTRACT

A framework in which annotated images can be analyzed in small batches to learn and distinguish between higher-quality annotations and lower-quality annotations, especially in the case of manual annotations for which quality assurance is desired. This framework is extremely generalizable and can be used for indoor images, outdoor images, medical images, etc., without limitation. An echo state network (ESN) is provided as a special case of semantic segmentation model that can be trained using as few as tens of annotated images to predict semantic regions and provide metrics that can be used to distinguish between higher-quality annotations and lower-quality annotations.

20 Claims, 5 Drawing Sheets

(56) References Cited

U.S. PATENT DOCUMENTS

| | | | |
|---|---|---|---|
| 2019/0294999 A1* | 9/2019 | Guttmann | G06F 18/217 |
| 2019/0311478 A1 | 10/2019 | Avendi et al. | |
| 2019/0392487 A1* | 12/2019 | Duke | G06N 3/08 |
| 2021/0134085 A1 | 5/2021 | Hu et al. | |
| 2021/0192182 A1 | 6/2021 | Huang et al. | |
| 2021/0287430 A1 | 9/2021 | Li et al. | |
| 2021/0406533 A1* | 12/2021 | Arroyo | G06F 16/5846 |

\* cited by examiner

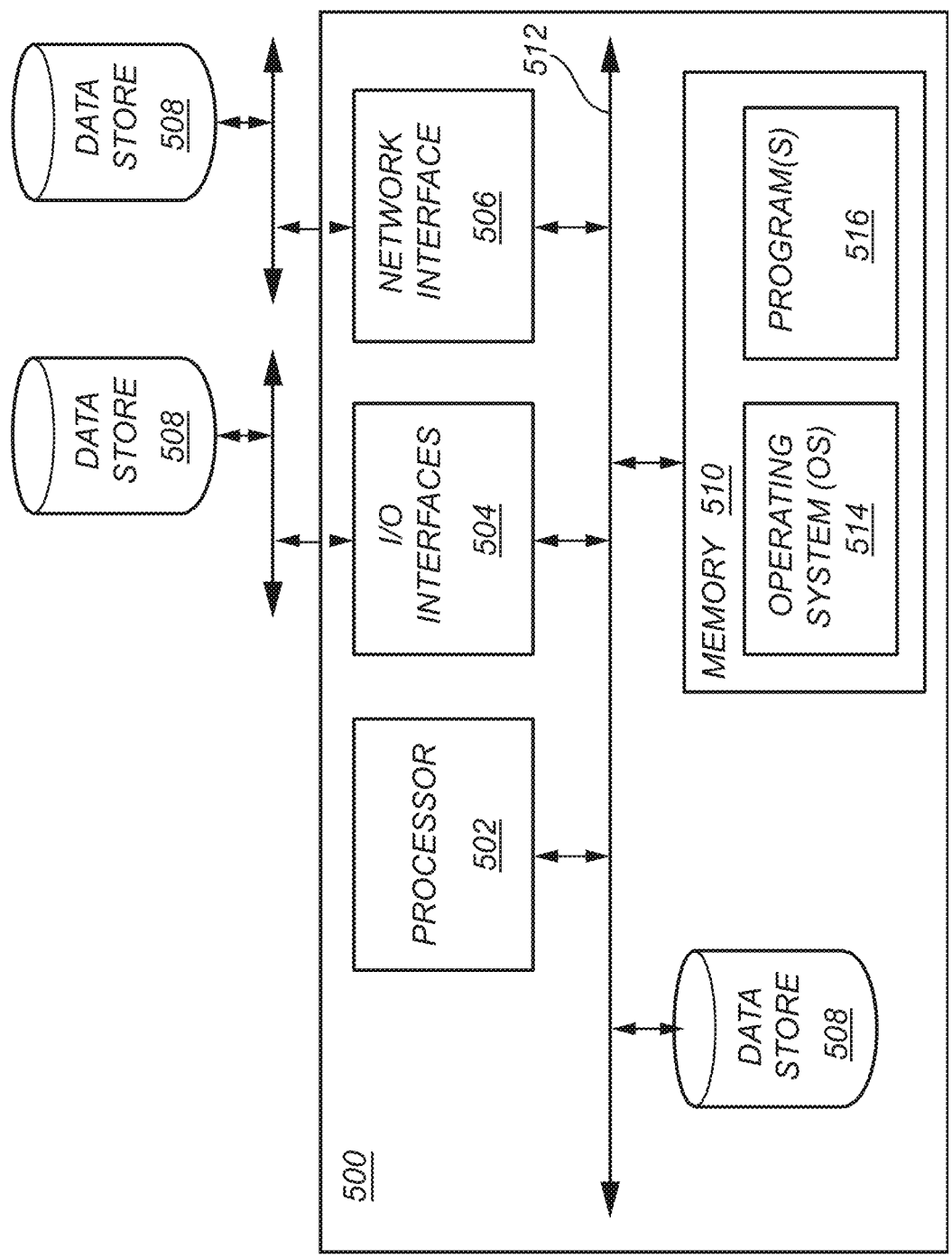

METHODS AND SYSTEMS FOR THE AUTOMATED QUALITY ASSURANCE OF ANNOTATED IMAGES

CROSS-REFERENCE TO RELATED APPLICATION

The present disclosure is a continuation (CON) of co-pending U.S. patent application Ser. No. 16/867,585, filed on May 6, 2020, and entitled "METHODS AND SYSTEMS FOR THE AUTOMATED QUALITY ASSURANCE OF ANNOTATED IMAGES," the contents of which are incorporated in full by reference herein.

TECHNICAL FIELD

The present disclosure relates generally to the automotive and autonomous driving/advanced driver assistance systems (AD/ADAS) fields. More particularly, the present disclosure relates to methods and systems for the automated quality assurance of annotated images used to train AD/ADAS systems.

BACKGROUND

Modern AD/ADAS systems require large volumes of annotated image data to provide evolving functionalities. Various techniques have been developed to filter such annotated image data to separate easy versus tough images to annotate, for example, to streamline the workflow necessarily assigned to manual image annotators. However, no techniques have been developed to determine which manually annotated images are of higher annotation quality and which manually annotated images are of lower annotation quality, thereby automating the extremely tedious quality assurance process.

When a batch of images are manually annotated by multiple annotators, for semantic segmentation, for example, it is extremely time consuming and costly to manually quality assure the resulting annotations to keep high-quality annotations and discard low-quality annotations. Although multi-expert systems (e.g., active learning frameworks) have been widely explored for regional proposal detection using deep learning solutions, such multi-expert systems require at least a few hundred images to be initially trained. Further, no standard metrics have been identified to distinguish a high-quality manual annotation from a low-quality manual annotation, even using such multi-expert systems.

The above-described background relating to annotation systems for automotive AD/ADAS systems is merely intended to provide a contextual overview of some current issues and is not intended to be exhaustive. Other contextual information may become apparent to those of ordinary skill in the art upon review of the following description of exemplary embodiments.

SUMMARY

The present disclosure provides a standardizing framework in which annotated images can be analyzed in small batches to learn and distinguish between higher-quality annotations and lower-quality annotations, especially in the case of manual annotations, where annotation quality can be subjective. The proposed framework provides an automatic and repeatable system that ensures the consistent selection of high-quality annotations from low-quality annotations and invokes manual quality assurance on only a limited subset of manual annotations where said automation fails. This framework is extremely generalizable and can be used for indoor images, outdoor images, medical images, etc., without limitation. An echo state network (ESN), or heavily data augmented U-net model, is provided as a special case of semantic segmentation model that can be trained using as few as tens of annotated images to predict semantic regions and provide metrics that can be used to distinguish between higher-quality annotations and lower-quality annotations.

In various exemplary embodiments, the present disclosure provides a method, non-transitory computer readable medium, and system, including steps and means for: training a plurality of parallel semantic segmentation models on an initial annotated dataset; using the trained plurality of parallel semantic segmentation models, generating a plurality of annotation regional proposals for a batch of images; using the plurality of annotation regional proposals, computing few confidence metrics that indicate a degree of agreement between the plurality of annotation regional proposals; providing the batch of images to a first manual annotator and a second manual annotator to generate a first manual annotation set and a second manual annotation set and determining a first confidence score associated with the first manual annotator related to the first manual annotation set and a second confidence score associated with the second manual annotator related to the second manual annotation set; and assessing a preferred of the first manual annotator and the second manual annotator by comparing the first confidence scores and the second confidence scores.

The plurality of parallel semantic segmentation models comprises a plurality of parallel echo state network models. The initial annotated dataset comprises fewer than 100 annotated images, and preferably only tens of annotated images. The confidence metric is computed with the plurality of annotation regional proposals as inputs by computing the IOU and F1 scores for regional proposal pairs (IOU_12 (P1,P2), F1_12(P1,P2) IOU_23(P2,P3), F1_23(P2,P3) and computing confid_p=mean(IOU12,IOU23,IOU12)/variance (IOU12, IOU23,IOU13), where the denominator is the variance between paired IOUs or F1 scores and numerator is the mean. A low value of this metric implies high disagreeability in the regional proposals, which mostly necessitates manual intervention to decide regarding the annotation quality. After the first confidence score, the second confidence score is determined by finding pairs of IOUs and F1s between each manual annotated image U1, U2 and regional proposals (U1,P1), (U1,P2) (U2,P3) of each manual annotation set. Assessing the preferred of the first manual annotator and the second manual annotator comprises: if the first confidence score and the second confidence score are below a predetermined threshold and/or similar to a predetermined degree, declaring a quality assessment automation failure and providing the first manual annotation set and the second manual annotation set to a master manual annotator for analysis; and if the first confidence score and the second confidence score are different to a predetermined degree, declaring a quality assessment automation success and selecting the preferred of the first manual annotator and the second manual annotator based on the higher of the first confidence score and the second confidence score.

Optionally, the method, non-transitory computer readable medium, or system is used in training an autonomous driving/advanced driver assistance system of a vehicle.

BRIEF DESCRIPTION OF THE DRAWINGS

The present disclosure is illustrated and described with reference to preferred embodiments and specific examples thereof, in which like reference numbers are used to denote like system components/method steps, as appropriate, and in which:

FIG. 5 is a schematic diagram illustrating an exemplary processing environment in which the automated annotation quality assurance system/method of the present disclosure may be used.

DESCRIPTION OF EMBODIMENTS

The present disclosure provides a framework in which annotated images can be analyzed in small batches to learn and distinguish between higher-quality annotations and lower-quality annotations, especially in the case of manual annotations for which quality assurance is desired. This framework is extremely generalizable and can be used for indoor images, outdoor images, medical images, etc., without limitation. An ESN is provided as a special case of semantic segmentation model that can be trained using as few as tens of annotated images to predict semantic regions and provide metrics that can be used to distinguish between higher-quality annotations and lower-quality annotations.

Figure 1:
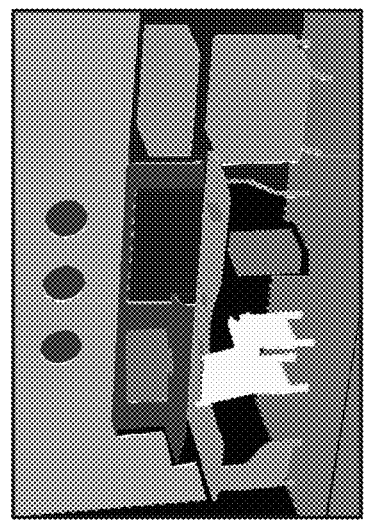
FIG. 1 is a series of images demonstrating inter-observer variability in indoor image annotations in view of which a quality assurance operation must be carried out.
Figure 1:
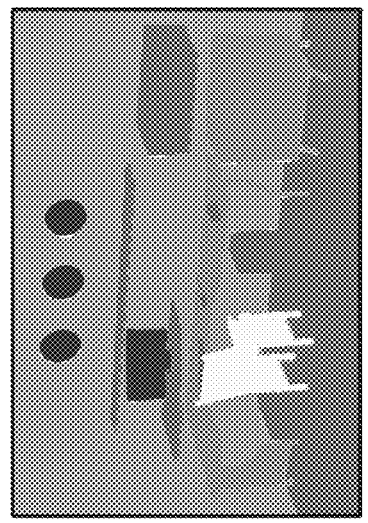
Figure 1:
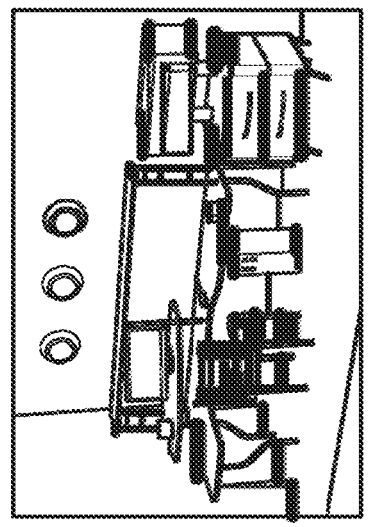

Referring now specifically to FIG. 1, an autonomous system (with an indoor/outdoor camera setup) problematically requires large volumes of quality annotated data to be well calibrated. Data frugality (i.e., learning from a few annotated image frames) is also a pressing issue in the medical image community since obtaining quality annotated data with high granularity is time consuming and expensive. Inter-observer variability is defined as the difference in opinion between two manual annotators annotating the same image. FIG. 1 demonstrates this, showing an original image (O) 110, as well the related manual annotations of annotator 1 (G1) 112 and annotator 2 (G2) 114. It is difficult to determine which annotation, G1 112 or G2 114, is actually of higher quality. Some existing works have looked at the F1 (Dice) score, intersection-over-union (IOU) score, aggregated Jaccard index, and accuracy variability (predicted semantic segmentation evaluated against G1 112, G2 114, and G1 (intersection) G2), but there is no consensus on a protocol to identify which annotated image must be selected for the best reproducible outcomes.

Figure 2:
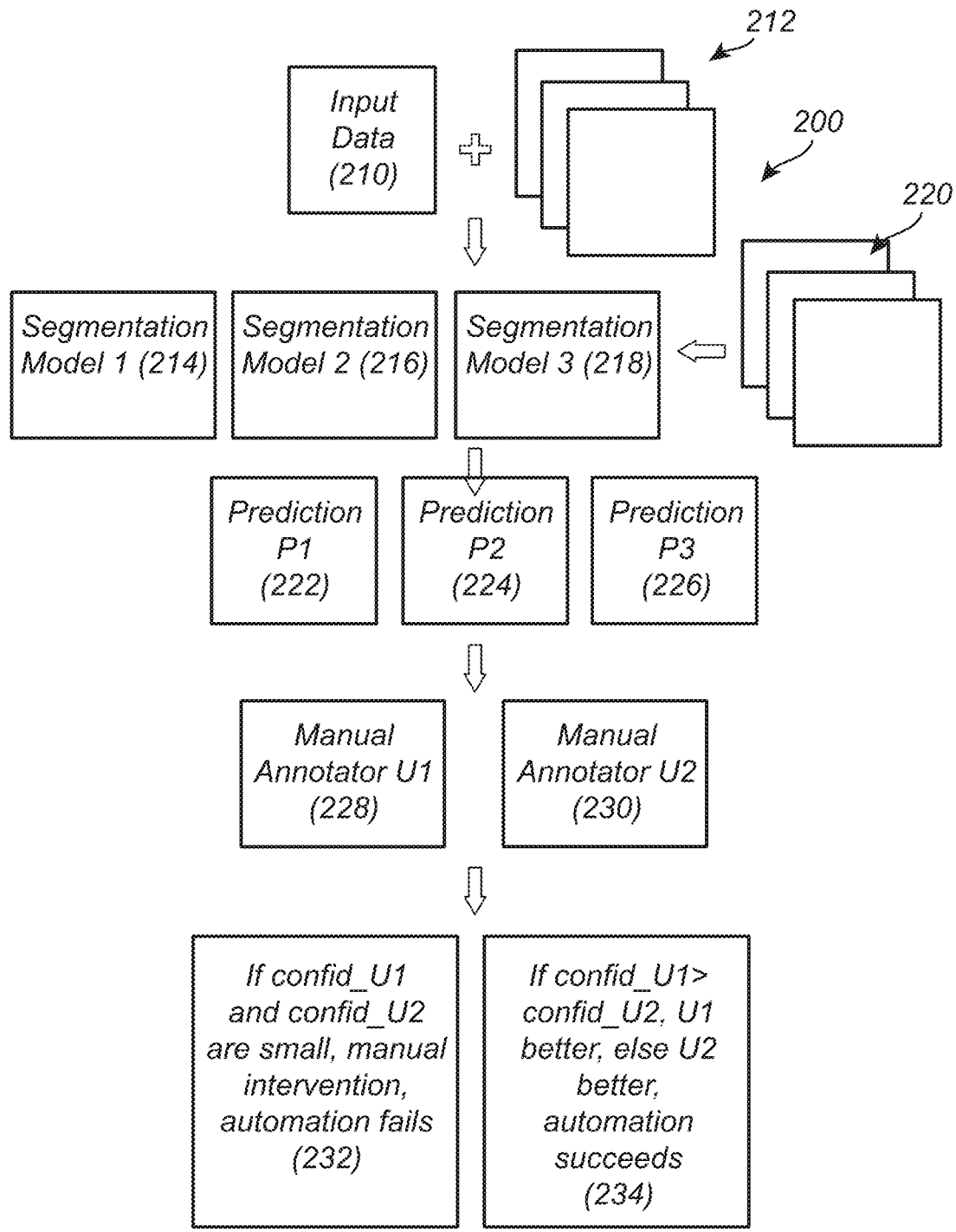
FIG. 2 is a schematic diagram illustrating one exemplary embodiment of the automated annotation quality assurance system/method of the present disclosure.

Referring now specifically to FIG. 2, in one exemplary embodiment, the system/method 200 of the present disclosure includes a first step in which three parallel semantic segmentation models 214, 216, and 218 are trained based on a batch of input data 210 and manually analyzed and semantically segmented images 212, which includes 10-15 images, for example. These semantic segmentation models 214, 216, and 218 can be, for example, ESN models that require only tens of images for training purposes.

As is well known to those of ordinary skill in the art, an ESN is a recurrent neural network (RNN) with a limited-connection hidden layer. The connectivity and weights of the hidden neurons are fixed and randomly assigned. The weights of the output neurons can be learned so that the network can produce and reproduce specific temporal patterns. Although the behavior of the network is non-linear, the only weights that are modified during training are for the synapses that connect the hidden neurons to the output neurons. Thus, the error function is quadratic with respect to the parameter vector and can be differentiated easily to a linear system. RNNs operate based on supervised learning principles. RNNs are dynamic systems and not functions. RNNs are typically used to learn dynamic processes. An ESN first operates as a large, fixed, random, recurring neural network with the input signal, which induces a nonlinear response signal in each neuron, and second connects a desired output signal by a trainable linear combination of the response signals.

Prior work has provided for the batch-wise training of ESNs that are modified to incorporate spatial and neighborhood-based features from images with similar orientations and segmentation objectives. These ESN modifications enable region-specific feature abstraction from a small set of training images, such that hybrid features specific to a variety of segmentation objectives can be quickly learned per training batch and applied to a large test set thereafter. This framework is generalizable for images and video frame annotation, segmentation, and video interpolation tasks. The ESN architecture is modified to incorporate both spatial and temporal features, not only from within an image, but also from across a batch of training images. This modified ESN architecture significantly increases the accuracy of semantic segmentation across a variety of datasets. A mechanism for the modified ESN network to generate neighborhood region per image-pixel is provided to create larger feature vectors per image-pixel. A fast neighborhood feature extraction process is also provided that eliminates the need to query the two-dimensional neighborhood for each pixel to minimize the computational time complexity. The modified ESN framework generates very fast segmentation proposals (e.g., 1 second per image) by utilizing only 20-30% of a dataset for training and testing on the remaining 70-80% of the dataset. Furthermore, this architecture is scalable across a variety of datasets and segmentation objectives across images and video sequences.

Vision-related machine learning models for AD/ADAS systems require annotated images to train the models for automated detection tasks. The present framework is capable of quickly learning the segmentation objective from a small set of images and providing segmentation regional proposals for foreground, object, and region segmentation tasks across images and video sequences. This framework is highly optimized for iteratively processing small batches of images using a feature readout mechanism and is capable of high-level feature abstraction from multiple color image planes using an ESN architecture that has been modified to incorporate spatial and temporal characteristics across image frames.

The ESN architecture is modified to accept spatial and temporal features within an image and across a batch of images. The neighborhood region per image-pixel is utilized to generate larger feature vectors per image-pixel, followed by feature dimension increase and dimension reduction steps. This modification significantly increases the accuracy of regional segmentation across a variety of datasets. The process to extract neighborhood-region information per pixel for larger feature vector generation is an optimized process. Again, the framework is capable of generating segmentation regional proposals in about 1 second per image by learning from only 20-30% of a data set and testing on the remaining 70-80% of the dataset. The proposed framework is highly scalable and generalizable across a variety of datasets.

Referring again specifically to FIG. 2, in a second step, for a test batch of 5 images 220, for example, the three semantic segmentation models 214, 216, and 218 are used to generate three regional proposals P1 222, P2 224, and P3 226. These regional proposals 222, 224, and 226 are estimations regarding where objects of interest are located, e.g. the floor, the ceiling, a wall, etc. in a generic context.

In a third step, using P1 222, P2 224, and P3 226, a confidence metric, confid_p, is computed to assess the inter-agreement of the regional proposals P1 222, P2 224, and P3 226. A low confid_p suggests a lack of training or complex/unseen test image, thereby greater variability among the regional proposals P1 222, P2 224, and P3 226.

In a fourth step, each of the 5 test images 220 are annotated by two manual annotators, U1 228 and U2 230, for example. The problem is figuring out which of U1 228 and U2 230 has done a better job of annotating the images. Using the regional proposals P1 222, P2 224, and P3 226 and their confid_p, a confidence score is assigned to each of U1 228 and U2 230. Here, confid_U1=f(U1, P1, P2, P3, confid_p) and confid_U2=f(U2, P1, P2, P3, confid_p).

Finally, in a fifth step, a decision is made as to which user in the better annotator. If both scores are low and similar, then the automation fails and manual intervention is needed 232. However, if either U1 228 or U2 230 has a significantly higher confidence score than the other, then the automation is successful and the user with the higher confidence score is the better annotator.

A central contribution of the present disclosure is the use of confidence metrics that describe the uniqueness of each manual annotator U1 228 and U2 230. The standard known metrics include:

$$IOU(Jaccard)score=TP/(TP+FP+FN), \text{ and} \quad (1)$$

$$F1(Dice)score=2TP/(2TP+FP+FN), \quad (2)$$

where TP is a true positive, FP is a false positive, and FN is a false negative.

Here, confid_p takes P1, P2, and P3 as inputs. First, the IOU and F1 scores are computed for the regional proposal pairs (IOU_12(P1,P2), F1_12(P1,P2) ... IOU_23(P2,P3), F1_23(P2,P3) and:

$$confid\_p=mean(IOU(F1))/var(IOU(F1))), \quad (3)$$

where the denominator is the variance between the paired IOUs or F1 scores.

Similarly, pairs of IOUs and F1s are found for each manual annotated image (U1,P1), (U1,P2) ... (U2,P3). The proposal with the highest overlap with U1 and the highest confidence score is selected as the best user.

Figure 3:
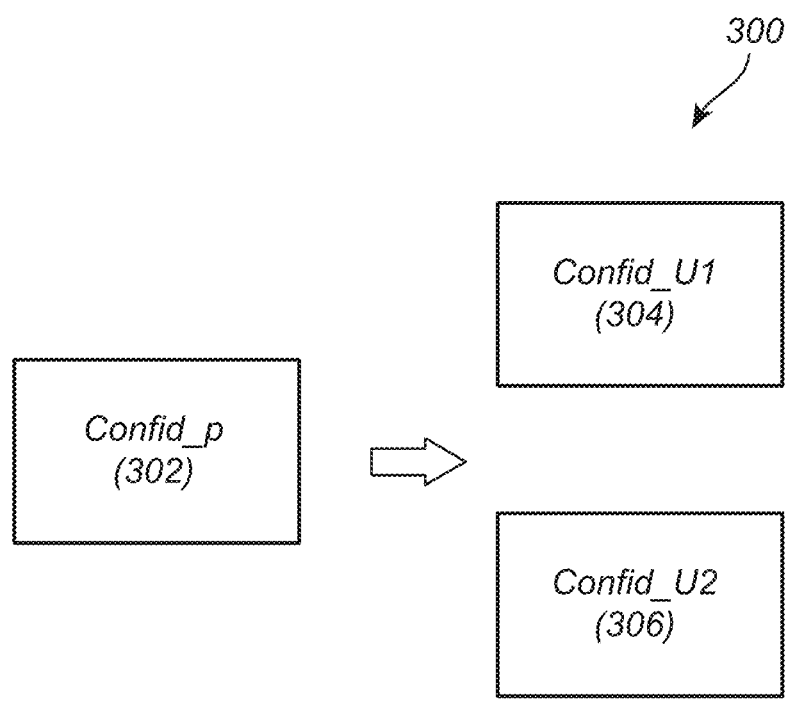
FIG. 3 is a schematic diagram illustrating the various confidence metrics of the present disclosure.

FIG. 3 is a schematic diagram illustrating the various confidence metrics 300 of the present disclosure, including confid_p 302, which is then used to determine confid_U1 304 and confid_U2 306.

Figure 4:
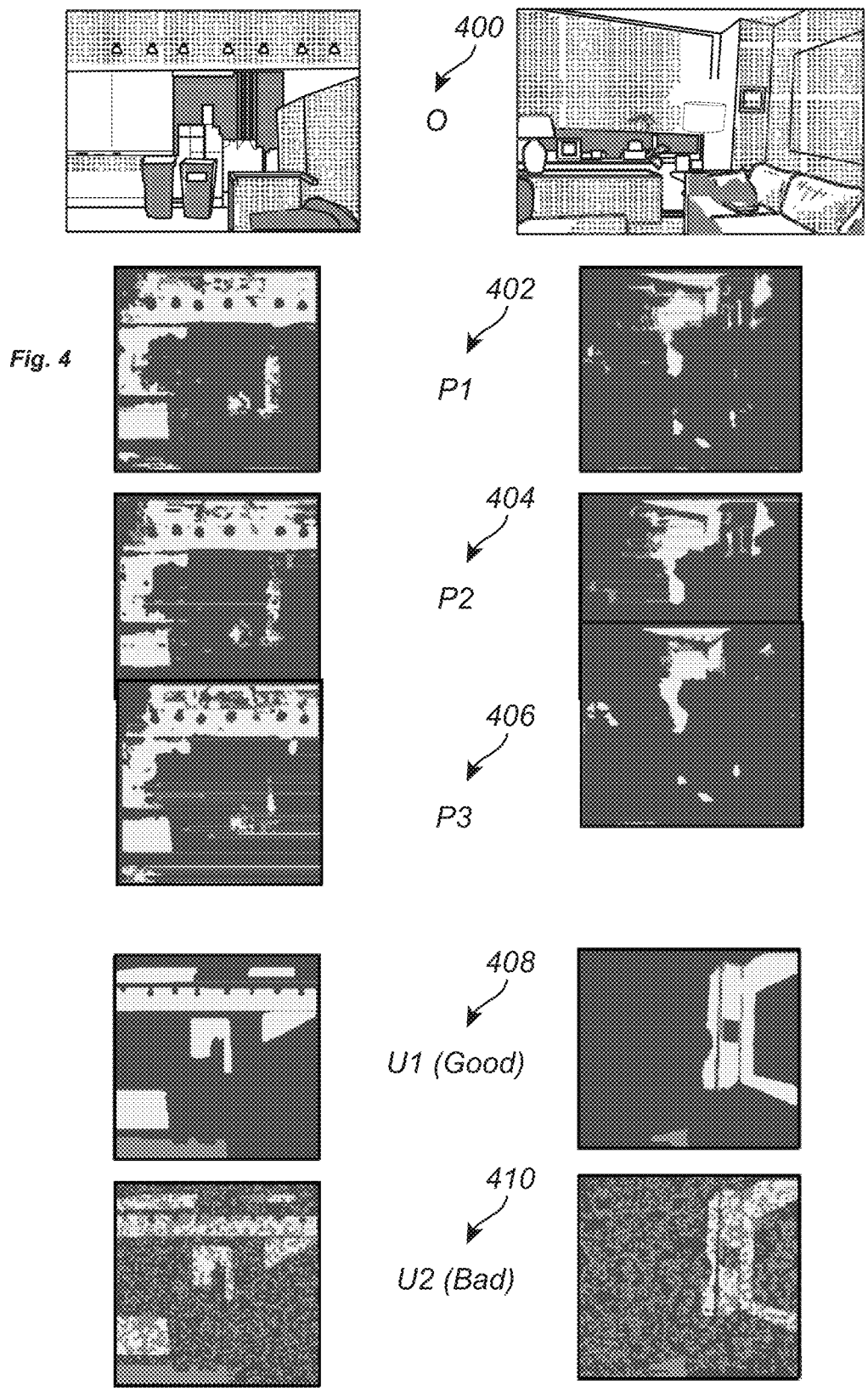
FIG. 4 is a series of images associated with the present disclosure, including two original images, the associated predicted annotated images generated by the various trained models, and the associated good and bad manual annotator images.

FIG. 4 is a series of images associated with the present disclosure, including two original images 400, the associated predicted annotated images generated by the various trained models 402, 404, and 406, and the associated good and bad manual annotator images 408 and 410. Here, by way of example only, for the first image set, confid_U1=3.96 and (IOU)/5.04 (F1), while confid_U2=1.98 and (IOU)/2.69 (F1). For the first image set, confid_U1=1.8 and (IOU)/7.23 (F1), while confid_U2=0.41 and (IOU)/0.54 (F1).

In general, the quality assurance (QA) system of the present disclosure is good if the regional proposals are capable of predicting the average vicinity of the objects of interest. In a test case, the ESN model was trained on office images and tested on bathroom images, however, the position of walls, the ceiling, and the floor remain consistent. Hence, the regional proposals still have considerable overlap with the manual annotations. In situations where the automated system is clueless about the general area of occurrence of objects of interest, the overlap with manual regions may be <0.1 (indicative that something is off about the automated process) deeming this region unique. This threshold of 0.1 is computed empirically for certain cases only and will vary across use cases. In such situations with low confidence scores, manual intervention is generally needed for quality checking.

In a case where a "bad" regional proposal may be highly correlated to a "poor" manual annotation, the proposed method uses the confidence metric to identify such cases when manual intervention becomes necessary. The use of three regional proposals, for example, instead of one regional proposal, helps with such cases. Until a segmentation model is trained well, the variability (variance over mean across regional proposal overlaps) will initially be large and slowly decrease. The first step should be to check overlap among users and among regional proposals. In a scenario where regional proposals P1, P2, P3 have low overlap (i.e., are highly variable) with P3 being "bad" regional proposal and P1 being a "good" regional proposal. Given two users, U1*P3>U2*P1. Here, * implies pixel level multiplication of images. However, if one evaluates the metric for each image (mean/variance in pixel values), this value will be more controlled, or generally higher for U2 than U1. The rationale for this metric is that the variance in pixels for large regions of interest that are inaccurate will be much higher than for smaller correctly annotated regions. So even though, U1*P3>U2*P1, mean/var of pixel values will be higher for U2, thereby selecting U2 as the best annotator. So there are two metrics to rank users, namely the mean overlap with regional proposals and the mean over variance in pixel values for the image U*(P1 union P2 union P3). For both metrics, higher value implies stronger confidence to the annotator.

Thus, using the proposed setup, a novel QA method is provided that reduces manual intervention by more than 50%. The confidence metric provided helps scale the QA performance across large batches of data. The proposed method can be generalized across indoor, outdoor, and medical image sets and the like.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) a tangible computer-readable storage medium that is non-transitory or (2) a communication medium, such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

FIG. 5 is a block diagram of a server 500, which may be used in a cloud-based system, with a mobile application, in other systems, or standalone. For example, the cloud nodes and the central authority nodes may be formed as one or more of the servers 500. The server 500 may be a digital computer that, in terms of hardware architecture, generally includes a processor 502, input/output (I/O) interfaces 504, a network interface 506, a data store 508, and memory 510. It should be appreciated by those of ordinary skill in the art that FIG. 5 depicts the server 500 in an oversimplified manner, and a practical embodiment may include additional components and suitably configured processing logic to support known or conventional operating features that are not described in detail herein. The components 502, 504, 506, 508, and 510 are communicatively coupled via a local interface 512. The local interface 512 may be, for example, but is not limited to, one or more buses or other wired or wireless connections, as is known in the art. The local interface 512 may have additional elements, which are omitted for simplicity, such as controllers, buffers (caches), drivers, repeaters, and receivers, among many others, to enable communications. Further, the local interface 512 may include address, control, and/or data connections to enable appropriate communications among the aforementioned components.

The processor 502 is a hardware device for executing software instructions. The processor 502 may be any custom made or commercially available processor, a central processing unit (CPU), an auxiliary processor among several processors associated with the server 500, a semiconductor-based microprocessor (in the form of a microchip or chipset), or generally any device for executing software instructions. When the server 500 is in operation, the processor 502 is configured to execute software stored within the memory 510, to communicate data to and from the memory 510, and to generally control operations of the server 500 pursuant to the software instructions. The I/O interfaces 504 may be used to receive user input from and/or for providing system output to one or more devices or components.

The network interface 506 may be used to enable the server 500 to communicate on a network, such as the Internet. The network interface 506 may include, for example, an Ethernet card or adapter (e.g., 10BaseT, Fast Ethernet, Gigabit Ethernet, 10 GbE) or a Wireless Local Area Network (WLAN) card or adapter (e.g., 802.11a/b/g/n/ac). The network interface 506 may include address, control, and/or data connections to enable appropriate communications on the network. A data store 508 may be used to store data. The data store 508 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 508 may incorporate electronic, magnetic, optical, and/or other types of storage media. In one example, the data store 508 may be located internal to the server 500, such as, for example, an internal hard drive connected to the local interface 512 in the server 500. Additionally, in another embodiment, the data store 508 may be located external to the server 500 such as, for example, an external hard drive connected to the I/O interfaces 504 (e.g., SCSI or USB connection). In a further embodiment, the data store 508 may be connected to the server 500 through a network, such as, for example, a network-attached file server.

The memory 510 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 510 may incorporate electronic, magnetic, optical, and/or other types of storage media. Note that the memory 510 may have a distributed architecture, where various components are situated remotely from one another but can be accessed by the processor 502. The software in memory 510 may include one or more software programs, each of which includes an ordered listing of executable instructions for implementing logical functions. The software in the memory 510 includes a suitable operating system (O/S) 514 and one or more programs 516. The operating system 514 essentially controls the execution of other computer programs, such as the one or more programs 516, and provides scheduling, input-output control, file and data management, memory management, and communication control and related services. The one or more programs 516 may be configured to implement the various processes, algorithms, methods, techniques, etc. described herein.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A method, comprising:
training a plurality of parallel semantic segmentation models on an initial annotated dataset;
generating a plurality of annotation regional proposals for a batch of images;
computing a confidence metric indicating a degree of agreement between the plurality of annotation regional proposals;
providing the batch of images to a first manual annotator and a second manual annotator to generate a first manual annotation set and a second manual annotation set and determining a first confidence score associated with the first manual annotator related to the first manual annotation set and a second confidence score associated with the second manual annotator related to the second manual annotation set; and
assessing a preferred of the first manual annotator and the second manual annotator by comparing the first confidence score and the second confidence score;
wherein the confidence metric is computed with the plurality of annotation regional proposals as inputs by computing scores for regional proposal pairs and computing a confidence comprising a mean over a variance.

2. The method of claim 1, wherein the plurality of parallel semantic segmentation models comprises a plurality of parallel echo state network models.

3. The method of claim 1, wherein the initial annotated dataset comprises fewer than 100 annotated images.

4. The method of claim 1, wherein the confidence metric is computed with the plurality of annotation regional proposals as inputs by computing intersection-over-union (IOU) and Dice (F1) scores for the regional proposal pairs and computing a confidence (confid_p) comprising the mean over the variance, where a denominator is a standard deviation between paired IOU or F1 scores.

5. The method of claim 1, wherein the first confidence score and the second confidence score are each determined by finding pairs of IOUs and F1s for each manual annotated image of each manual annotation set.

6. The method of claim 1, wherein assessing the preferred of the first manual annotator and the second manual annotator comprises:
determining whether the first confidence score and the second confidence score are below a predetermined threshold and declaring a quality assessment automation failure and providing the first manual annotation set and the second manual annotation set to a master manual annotator for analysis if determined that the first confidence score and the second confidence score are below the predetermined threshold; and
determining whether the first confidence score and the second confidence score are different to a predetermined degree and declaring a quality assessment automation success and selecting the preferred of the first manual annotator and the second manual annotator based on the higher of the first confidence score and the second confidence score if determined that the first confidence score and the second confidence score are different to the predetermined degree.

7. The method of claim 1, wherein the method is used in training an autonomous driving/advanced driver assistance system of a vehicle.

8. A non-transitory computer readable medium stored in a memory and executed by a processor to execute the steps, comprising:
training a plurality of parallel semantic segmentation models on an initial annotated dataset;
using the trained plurality of parallel semantic segmentation models, generating a plurality of annotation regional proposals for a batch of images;
using the plurality of annotation regional proposals, computing a confidence metric indicating a degree of agreement between the plurality of annotation regional proposals;
providing the batch of images to a first manual annotator and a second manual annotator to generate a first manual annotation set and a second manual annotation set and determining a first confidence score associated with the first manual annotator related to the first manual annotation set and a second confidence score associated with the second manual annotator related to the second manual annotation set; and
assessing a preferred of the first manual annotator and the second manual annotator by comparing the first confidence score and the second confidence score;
wherein the confidence metric is computed with the plurality of annotation regional proposals as inputs by computing scores for regional proposal pairs and computing a confidence comprising a mean over a variance.

9. The non-transitory computer readable medium of claim 8, wherein the plurality of parallel semantic segmentation models comprises a plurality of parallel echo state network models.

10. The non-transitory computer readable medium of claim 8, wherein the initial annotated dataset comprises fewer than 100 annotated images.

11. The non-transitory computer readable medium of claim 8, wherein the confidence metric is computed with the plurality of annotation regional proposals as inputs by computing intersection-over-union (IOU) and Dice (F1) scores for the regional proposal pairs and computing a confidence (confide) comprising the mean over the variance, where a denominator is a standard deviation between paired IOU or F1 scores.

12. The non-transitory computer readable medium of claim 8, wherein the first confidence score and the second confidence score are each determined by finding pairs of IOUs and F1s for each manual annotated image of each manual annotation set.

13. The non-transitory computer readable medium of claim 8, wherein assessing the preferred of the first manual annotator and the second manual annotator comprises:
determining whether the first confidence score and the second confidence score are below a predetermined threshold and declaring a quality assessment automation failure and providing the first manual annotation set and the second manual annotation set to a master manual annotator for analysis if determined that the first confidence score and the second confidence score are below the predetermined threshold; and determining whether the first confidence score and the second confidence score are different to a predetermined degree and declaring a quality assessment automation success and selecting the preferred of the first manual annotator and the second manual annotator based on the higher of the first confidence score and the second confidence score if determined that the first confidence score and the second confidence score are different to the predetermined degree.

14. The non-transitory computer readable medium of claim 8, wherein the steps are used in training an autonomous driving/advanced driver assistance system of a vehicle.

15. A system, comprising:
a processor executing an algorithm stored in a memory operable for:
training a plurality of parallel semantic segmentation models on an initial annotated dataset;
using the trained plurality of parallel semantic segmentation models, generating a plurality of annotation regional proposals for a batch of images;
using the plurality of annotation regional proposals, computing a confidence metric indicating a degree of agreement between the plurality of annotation regional proposals;
providing the batch of images to a first manual annotator and a second manual annotator to generate a first manual annotation set and a second manual annotation set and determining a first confidence score associated with the first manual annotator related to the first manual annotation set and a second confidence score associated with the second manual annotator related to the second manual annotation set; and
assessing a preferred of the first manual annotator and the second manual annotator by comparing the first confidence score and the second confidence score;

wherein the confidence metric is computed with the plurality of annotation regional proposals as inputs by computing scores for regional proposal pairs and computing a confidence comprising a mean over a variance.

16. The system of claim 15, wherein the plurality of parallel semantic segmentation models comprises a plurality of parallel echo state network models.

17. The system of claim 15, wherein the initial annotated dataset comprises fewer than 100 annotated images.

18. The system of claim 15, wherein the confidence metric is computed with the plurality of annotation regional proposals as inputs by computing intersection-over-union (IOU) and Dice (F1) scores for the regional proposal pairs and computing a confidence (confid_p) comprising the mean over the variance, where a denominator is a standard deviation between paired IOU or F1 scores.

19. The system of claim 15, wherein the first confidence score and the second confidence score are each determined by finding pairs of IOUs and F1s for each manual annotated image of each manual annotation set.

20. The system of claim 15, wherein assessing the preferred of the first manual annotator and the second manual annotator comprises:
determining whether the first confidence score and the second confidence score are below a predetermined threshold and declaring a quality assessment automation failure and providing the first manual annotation set and the second manual annotation set to a master manual annotator for analysis if determined that the first confidence score and the second confidence score are below the predetermined threshold; and
determining whether the first confidence score and the second confidence score are different to a predetermined degree and declaring a quality assessment automation success and selecting the preferred of the first manual annotator and the second manual annotator based on the higher of the first confidence score and the second confidence score if determined that the first confidence score and the second confidence score are different to the predetermined degree.

* * * * *